US011555393B2

(12) United States Patent
Wu et al.

(10) Patent No.: US 11,555,393 B2
(45) Date of Patent: Jan. 17, 2023

(54) ELECTROMAGNETIC RANGING WITH AZIMUTHAL ELECTROMAGNETIC LOGGING TOOL

(71) Applicant: Halliburton Energy Services, Inc., Houston, TX (US)

(72) Inventors: Hsu-Hsiang Wu, Sugarland, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 186 days.

(21) Appl. No.: 16/937,059

(22) Filed: Jul. 23, 2020

(65) Prior Publication Data

US 2020/0355057 A1     Nov. 12, 2020

Related U.S. Application Data

(60) Division of application No. 16/384,877, filed on Apr. 15, 2019, now Pat. No. 10,746,011, which is a continuation of application No. 15/029,432, filed as application No. PCT/US2014/072742 on Dec. 30, 2014, now Pat. No. 10,273,794.

(51) Int. Cl.
| | |
|---|---|
| *E21B 44/00* | (2006.01) |
| *G01V 3/30* | (2006.01) |
| *G01V 13/00* | (2006.01) |
| *E21B 47/0228* | (2012.01) |

(52) U.S. Cl.
CPC .......... *E21B 44/00* (2013.01); *E21B 47/0228* (2020.05); *G01V 3/30* (2013.01); *G01V 13/00* (2013.01)

(58) Field of Classification Search
CPC ..... E21B 44/00; E21B 47/02216; G01V 3/30; G01V 13/00
See application file for complete search history.

(56) References Cited

U.S. PATENT DOCUMENTS

| | | | | |
|---|---|---|---|---|
| 2,699,611 | A | * | 1/1955 | Norden ............... E21B 47/0236 33/313 |
| 4,920,655 | A | * | 5/1990 | Van Steenwyk ...... E21B 47/022 33/324 |
| 5,218,301 | A | | 6/1993 | Kuckes |
| 6,438,495 | B1 | * | 8/2002 | Chau ..................... E21B 47/022 702/9 |

(Continued)

FOREIGN PATENT DOCUMENTS

| | | | | |
|---|---|---|---|---|
| CA | 2334525 A1 | * | 9/2001 | ............. E21B 47/01 |
| WO | 2014142796 A1 | | 9/2014 | |

(Continued)

OTHER PUBLICATIONS

Yong Ren et al., "A Measuring System for Well Logging Attitude and a Method of Sensor Calibration" Sensors 2014, 14, 9256-9270 (2014).*

(Continued)

*Primary Examiner* — Peter Bradford
(74) *Attorney, Agent, or Firm* — Delizio, Peacock, Lewin & Guerra

(57) ABSTRACT

Apparatus, systems, and methods for ranging operate to use a wireline active ranging system to initially determine a relative distance and relative direction from a first well (e.g., ranging well) to a second well (e.g., target well) and an EM azimuthal logging tool to maintain or adjust the distance from the target well while drilling the ranging well. Additional apparatus, systems, and methods are disclosed.

7 Claims, 3 Drawing Sheets

(56) References Cited

U.S. PATENT DOCUMENTS

| | | |
|---|---|---|
| 7,544,929 B1 | 6/2009 | Mickael |
| 2002/0135509 A1* | 9/2002 | Talbot .................. G01S 7/4021 |
| | | 342/174 |
| 2008/0041626 A1 | 2/2008 | Clark |
| 2009/0164127 A1 | 6/2009 | Clark |
| 2011/0006773 A1 | 1/2011 | Bittar |
| 2011/0308794 A1 | 12/2011 | Bittar et al. |
| 2012/0013339 A1 | 1/2012 | Kuckes et al. |
| 2012/0318578 A1* | 12/2012 | Schumacher ......... E21B 47/022 |
| | | 175/40 |
| 2013/0105224 A1 | 5/2013 | Donderici et al. |
| 2014/0374159 A1* | 12/2014 | McElhinney ......... E21B 43/305 |
| | | 175/45 |
| 2015/0346381 A1 | 12/2015 | Donderici |
| 2018/0138992 A1 | 5/2018 | Kraft et al. |
| 2019/0234195 A1 | 8/2019 | Wu et al. |

FOREIGN PATENT DOCUMENTS

| | | | |
|---|---|---|---|
| WO | WO-2015038102 A2 * | 3/2015 | ............. G01V 13/00 |
| WO | WO-2016080968 A1 * | 5/2016 | ............. E21B 43/14 |
| WO | 2016108840 A1 | 7/2016 | |
| WO | WO-2016153475 A1 * | 9/2016 | ......... E21B 47/0905 |
| WO | WO-2017203294 A1 * | 11/2017 | ........... E21B 47/065 |

OTHER PUBLICATIONS

U.S. Appl. No. 16/384,877, Notice of Allowance, dated Apr. 8, 2020, 8 pages.

Canadian Application Serial No. 2,967,932; Canadian First Examiner's Letter; dated Mar. 9, 2018, 12 Pages.

Canadian Application Serial No. 2,967,932; Examiner's Letter; dated Feb. 20, 2019, 3 pages.

International Application Serial No. PCT/US2014/072742, International Search Report dated Sep. 14, 2015, 3 pgs.

International Application Serial No. PCT/US2014/072742, Written Opinion dated Sep. 14, 2015, 8 pgs.

Renaudin, et al., "Complete Triaxis Magnetometer Calibration in Magnetic Domain", Hindawi Publishing Corporation; Journal of Sensors; vol. 2010, Article ID 967245, Sep. 6, 2010, 10 Pages.

* cited by examiner

ELECTROMAGNETIC RANGING WITH AZIMUTHAL ELECTROMAGNETIC LOGGING TOOL

BACKGROUND

Magnetic ranging provides relative direction and distance of one well with respect to another. Several technologies for ranging are based upon launching a current at a known frequency from the earth's surface down the casing of a target well and receiving a signal radiated from that casing in a ranging well. Other types of excitation, such as injecting a current at a depth below the surface, are also used in the ranging technologies.

Such ranging operations may use a wireline tool to provide both relative direction and distance from the ranging well to the target well. During a drilling operation, the drill string is removed from the ranging well and the wireline tool is inserted in order to continually update the relative distance and direction of the ranging well to the target well. This may result in increased drilling time and greater cost due to the expense of repeatedly removing the drill string to insert the wireline tool.

DETAILED DESCRIPTION

Many embodiments described herein operate to provide information that assists in determining relative distance and direction to one well, such as a well being drilled, to another well. For example, such embodiments can be used when determining the location of a target well in relation to a ranging well.

A "target well" may be defined herein as a well, the location of which is to be used as a reference by another well. The other well may be defined as a "ranging well". Other embodiments may reverse this terminology since the embodiments are not limited to any one well-being the target well and any one well-being the ranging well.

Some embodiments use a wireline active ranging system to determine a relative distance and relative direction from a first well (e.g., ranging well) to a second well (e.g., target well) until the ranging well reaches a desired distance. Thereafter, a logging while drilling (LWD) azimuthal electromagnetic (EM) logging system is used to maintain or adjust (e.g., increase, decrease) the desired distance while drilling. The desired distance may be defined as the distance at which the azimuthal EM logging tool can accurately track the target well. This distance may vary depending on the frequency used by the logging tool as well as the desired accuracy. A wireline operation may use the azimuthal EM logging tool for determining a range to a target well while the drilling operation may use the tool for ranging while drilling the ranging well.

The wireline ranging system is first used to provide distance and direction to the second well (target well) since it can provide a higher accuracy in determination of distance and longer range detection based on gradient measurements with very low operating frequency. However, since the wireline uses multiple trip-in and trip-out drilling activities to achieve the desired ranging requirements, the azimuthal EM logging system is introduced to guide the logging tool in the correct direction relative to the target well or to maintain a desired direction relative to the target well. Such azimuthal measurements are sensitive to the formations surrounding the tool as well as to the conductive casing in the target well. This combination of two systems can be utilized for three types of ranging applications: 1) well ranging with a desired and fixed separation, 2) well intersection, and 3) well avoidance. These examples will now be described in more detail.

Figure 1:
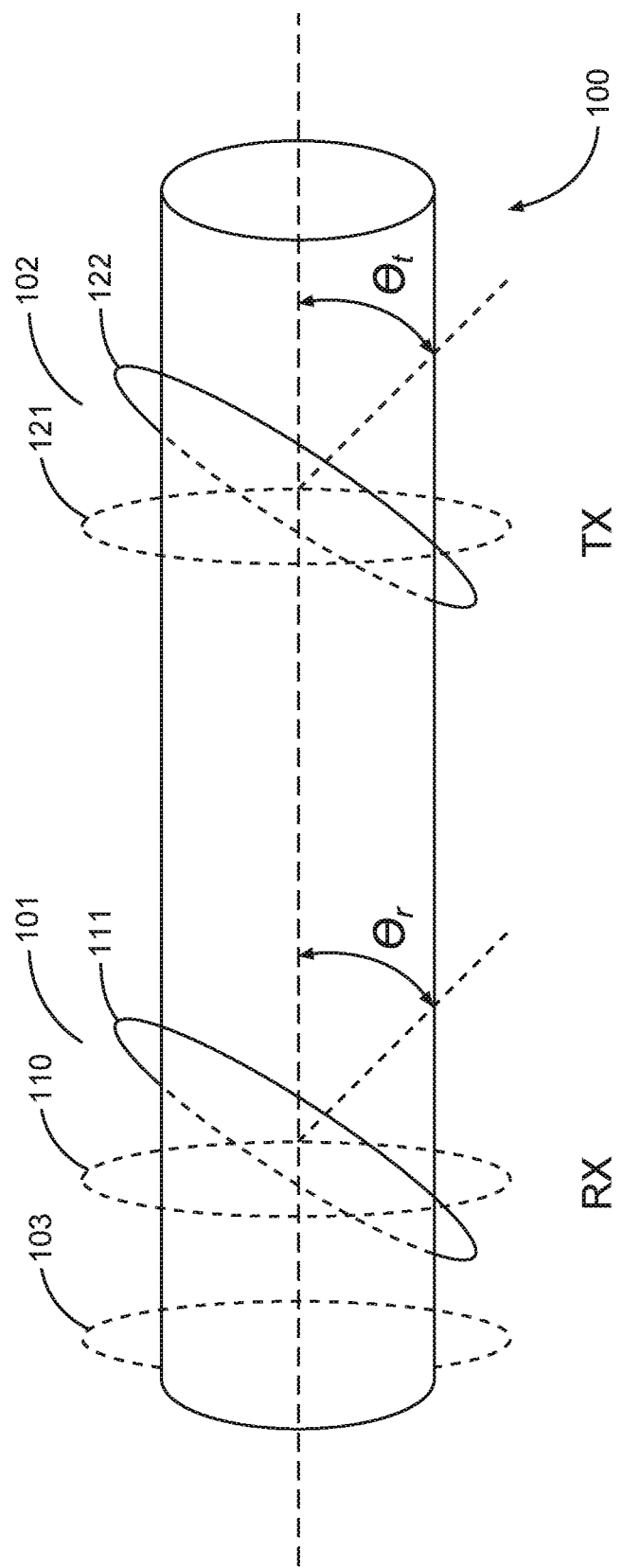
FIG. 1 is a diagram showing an azimuthal electromagnetic (EM) logging tool according to various embodiments of the invention.

FIG. 1 is a diagram showing an azimuthal electromagnetic (EM) logging tool 100 according to various embodiments of the invention. The logging tool 100 includes at least one transmit coil antenna 102 and at least one receive coil antenna 101 separated axially along the tool body 100. An embodiment may include one transmit coil antenna 102 and multiple receive coil antennas 101, 103.

At least one of the antennas 101, 102 of the azimuthal EM logging tool 100 may be tilted with respect to the longitudinal axis of the tool 100. FIG. 1 shows different tilted positions 110, 111 for the receive antenna 101 and different tilted positions 121, 122 for the transmit antenna. The receive antenna 101 may be tilted by an angle $\vartheta_r$ (e.g., 45°) and the transmit antenna 102 may be tilted by an angle $\vartheta_t$ (e.g., 45°). These angles do not have to be equal. The antenna tilt enables an increase in azimuthal sensitivity. Having only one of the transmitter or receiver tilted provides a small but measurable sensitivity to the target well casing. Having both transmitter and the receiver tilted provides substantially higher sensitivity to the target well casing.

Figure 2:
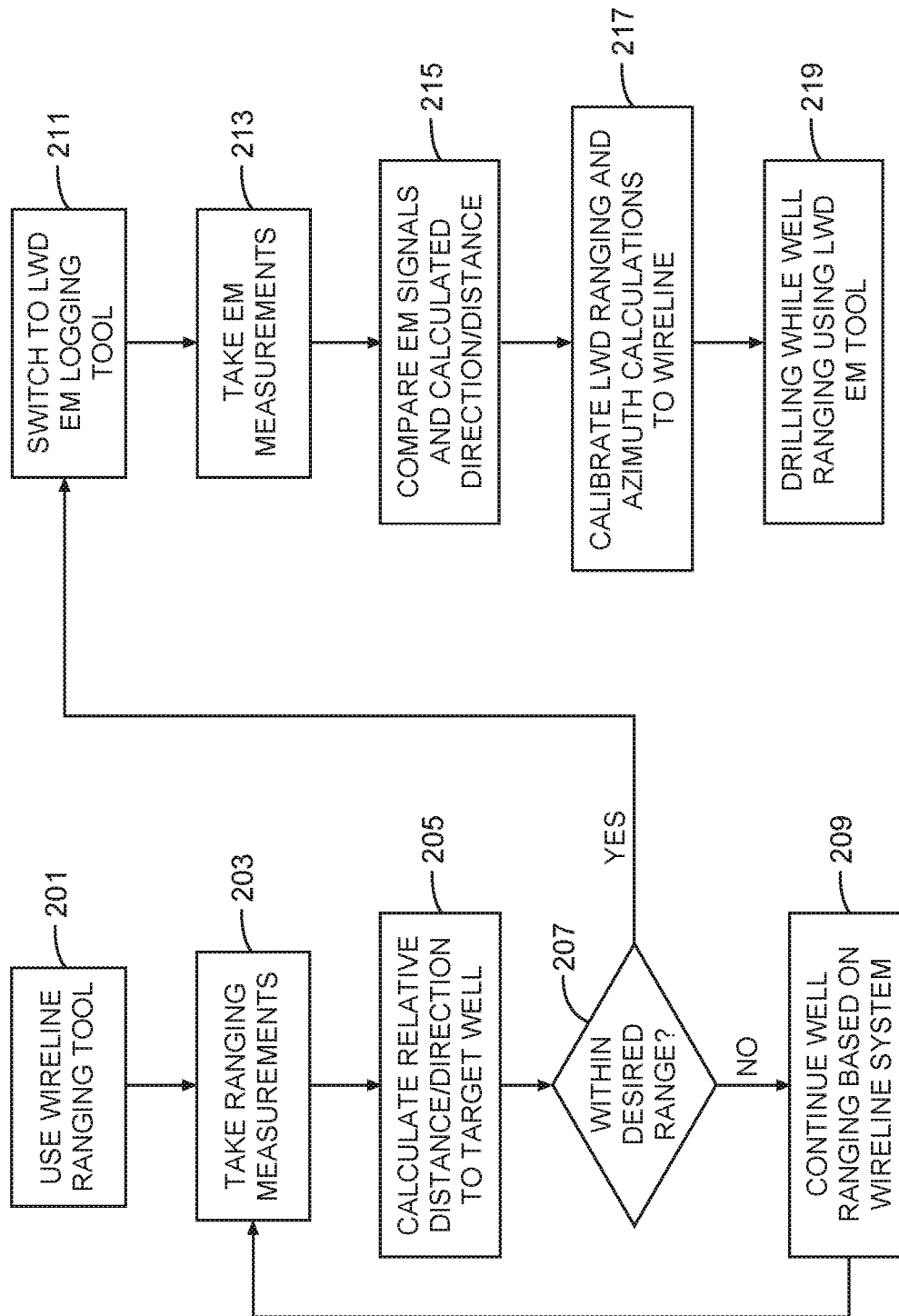
FIG. 2 is a flowchart showing methods for magnetic ranging in accordance with various embodiments of the invention.

FIG. 2 is a flowchart showing methods for magnetic ranging in accordance with various embodiments of the invention. In many embodiments, a method begins at block 201, where a wireline ranging system is lowered into the ranging well. The wireline ranging system operates first to take EM ranging measurements, in block 203, and then to calculate a relative direction and distance to the target well, in block 205. This calculated relative direction and distance are used subsequently when the azimuthal EM logging tool is used, to determine if they are within a desired range, as determined by a frequency used by the azimuthal logging tool to take electromagnetic measurements. The ranging may be accomplished in various ways.

In LWD ranging applications, an oscillating magnetic field may be induced in the target well. This can be achieved using an EM source, such as the transmit antenna 102 of FIG. 1, transmitting an EM signal in the drilling well to induce current signals in the target well due to conductive casing properties in the target well. Received EM azimuthal signals corresponding to the induced current signals, as received by the receive antenna 101 of FIG. 1, may be used to calculate the relative distance and direction from the ranging well to the target well. In wireline ranging applications, the current signals may be directly applied to the target well at surface or applied to the ranging well so that current flows from the ranging well to the target well through formations downhole. The receivers in the ranging well may be used to determine the magnetic fields due to the current signals in the target well to determine the relative distance and direction between the two wells.

In block 207, it is determined when the calculated distance is within a desired detection range. For example, the desired detection range may be a detection range in which the azimuthal EM tool may be able to accurately track the target well (i.e., the signal from the target well is substantially larger than the measurement error—large enough to provide a desired ranging accuracy with respect to the distance between the wells). For example, the distance at which the range accuracy is within 10 percent of the actual value may be chosen as the desired detection range. If the calculated distance is not approximately equal to, or less than, the desired detection range, the method continues to block 209 where the well ranging continues using the wireline system between drilling operations. Thus, the method loops through blocks 203-207 until the calculated distance has decreased to be within the bounds (i.e., equal to or less than) of the desired detection range.

The azimuthal EM tool may be used when the relative calculated distance has been reduced to approximately the desired detection range. In block 211, the wireline logging system may then be removed from the ranging well and the azimuthal EM tool is used to replace it. The azimuthal EM logging tool is part of the drill string and may be used to maintain or adjust the relative distance between the ranging well and the target well. Use of the azimuthal EM logging tool for ranging, as opposed to a wireline logging system, may yield an advantage since the azimuthal EM logging tool measurements may be made while drilling, thus resulting in time and cost savings.

Various embodiments may be applied to different types of ranging applications. For example, one type of ranging includes acquiring a fixed separation between the ranging well (e.g., drilling well) and the target well within a particular depth range and maintaining that fixed separation during the drilling operations. This type of ranging may be useful for applications such as paralleling the target well path with the ranging well in order to perform a Steam-Assisted Gravity Drainage (SAGD) operation.

Another type of ranging includes acquiring the relative direction from the ranging well (e.g., drilling well) to the target well such that one can intersect the target well, or avoid the target well, as desired. In this type of ranging, the azimuthal EM logging tool provides directions in real-time to the drilling system in order to steer the drill bit toward, or away from, the target well. Once the distance has decreased sufficiently, the azimuthal EM logging tool itself is capable of providing distance/direction from the drilling well to the target well for as long as the separation between the two wells is within detection range of the EM system.

In block 213, the azimuthal EM logging tool operates at the same measured depth as the last wireline measurement so that EM measurements are taken, and compared in block 215 with the calculated distance and direction from the wireline system (acquired as part of the activity for block 205 of the method). In block 217, the relative direction and distance to the target well may be obtained to calibrate LWD ranging and azimuth calculations obtained from the wireline system. In block 219, the azimuthal EM logging tool may be used for well ranging to provide relative direction and distance between the two wells without using the wireline logging system.

The calibration of the LWD signal to distance can be accomplished by collecting a number of distance measurements using both the wireline logging tool and the azimuthal EM logging tool, and estimating the parameters of a calibration function. If the wireline range measurements are denoted as $d_w(z_i)$ at depth $z_i$ and the azimuthal EM tool range measurements are denoted as $d_l(z_i)$ at depth $z_i$, a mapping function $f$, with mapping parameter vector p can be constructed to map any LWD data to wireline data as follows:

$$d_w(z_i) = f(d_l(z_i), p) \quad (1)$$

Parameter vector p can be found by looking for the value of p that minimizes the mismatch between the wireline data and mapped LWD data as follows:

$$p = \mathrm{argmin}_p (d_w(z_i) - f(d_l(z_i), p)) \quad (2)$$

Once the value of the p vector is calculated, any subsequent azimuthal EM logging tool measurements can be calibrated as follows:

$$d_{lcal}(z_i) = f(d_l(z_i), p) \quad (3)$$

where $d_{lcal}(z_i)$ is the corrected LWD range measurement at depth $z_i$.

One selection for mapping function $f$, among others that may be made, is as follows. In this case, the selection provides the equivalent to a multiplicative correction where A is an azimuth measurement:

$$f(A, p) = Ap \quad (4)$$

The values for the azimuth to the target well may be corrected the same way as described above, using a different mapping function and a parameter vector. In the case of azimuth, an additive correction of the form $f(A, p) = A + p$ may be used. Other forms of mapping parameter vector p as function of azimuth angle $\phi$, such as $f(A, p, \phi) = A(\phi)p(\phi)$ or $f(A, p, \phi) = A(\phi) + p(\phi)$, may be used in the mapping function. It is noted here that the calibration may be applied multiple times in case there are expected/measured changes in the target casing properties (i.e., casing or tubing diameter or thickness changes based on well completion history of the target). Calibration may also be re-applied when abnormalities in the signal are observed (i.e., abrupt and unexpected shifts, large amounts of noise).

Figure 3:
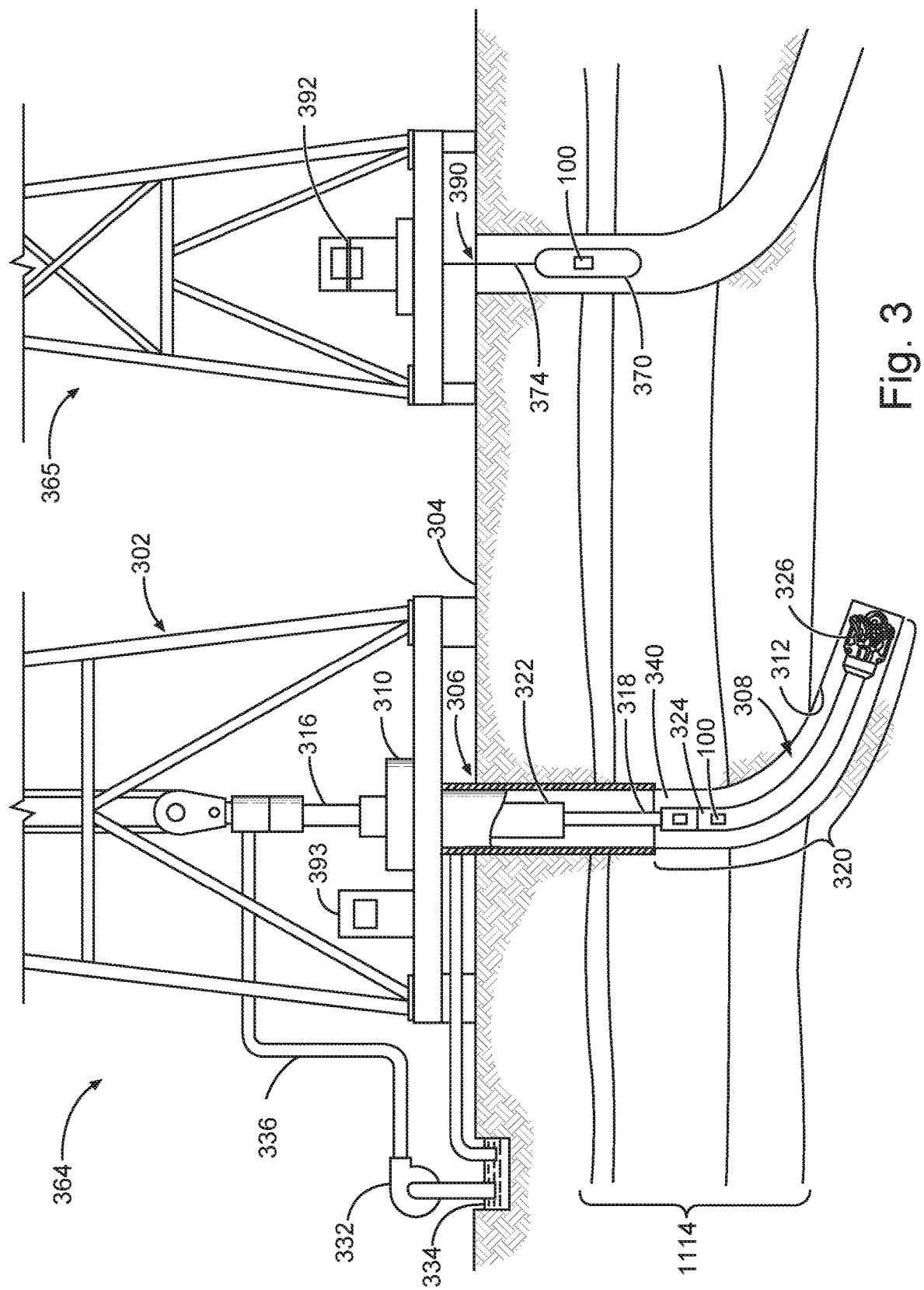
FIG. 3 is a diagram of wireline and drilling systems using target well ranging according to various embodiments of the invention.

FIG. 3 is a diagram of wireline 365 and drilling 364 systems using target well ranging according to various embodiments of the invention. The wireline system 365 may use a wireline ranging tool (e.g., azimuthal EM logging tool 100) for determining a range to a target well while the drilling system 364 may use the azimuthal EM logging tool 100 for ranging while drilling the ranging well.

Either of the wells 306, 390 may be the ranging well while the other is the target well. However, for purposes of illustration, the well 306 shown under construction is the ranging well as it is being constructed to range from the other well 390 (i.e., target well).

Drilling of oil and gas wells is commonly carried out using a string of drill pipes connected together so as to form a drilling string that is lowered through a rotary table 310 into a wellbore or borehole 312. A system 364 may form a portion of a drilling rig 302 located at the surface 304 of a well 306. The drilling rig 302 may provide support for a drill string 308. The drill string 308 may operate to penetrate a rotary table 310 for drilling a borehole 312 through subsurface geological formations 314. The drill string 308 may include a Kelly 316, drill pipe 318, and a bottom hole assembly 320, perhaps located at the lower portion of the drill pipe 318.

The bottom hole assembly 320 may include drill collars 322, a downhole tool 324, and a drill bit 326. The drill bit 326 may operate to create a borehole 312 by penetrating the surface 304 and subsurface geological formations 314. The downhole tool 324 may comprise any of a number of different types of tools including the azimuthal EM logging tool 100.

During drilling operations, the drill string 308 (perhaps including the Kelly 316, the drill pipe 318, and the bottom hole assembly 320) may be rotated by the rotary table 310. In addition to, or alternatively, the bottom hole assembly 320 may also be rotated by a motor (e.g., a mud motor) that is located downhole. The drill collars 322 may be used to add weight to the drill bit 326. The drill collars 322 may also operate to stiffen the bottom hole assembly 320, allowing the bottom hole assembly 320 to transfer the added weight to the drill bit 326, and in turn, to assist the drill bit 326 in penetrating the surface 304 and subsurface formations 314.

During drilling operations, a mud pump 332 may pump drilling fluid (sometimes known by those of skill in the art as "drilling mud") from a mud pit 334 through a hose 336 into the drill pipe 318 and down to the drill bit 326. The drilling fluid can flow out from the drill bit 326 and be returned to the surface 304 through an annular area 340 between the drill pipe 318 and the sides of the borehole 312. The drilling fluid may then be returned to the mud pit 334, where such fluid is filtered. In some embodiments, the drilling fluid can be used to cool the drill bit 326, as well as to provide lubrication for the drill bit 326 during drilling operations. Additionally, the drilling fluid may be used to remove subsurface formation 314 cuttings created by operating the drill bit 326.

In various embodiments, the azimuthal EM logging tool 100 may be included in a wireline ranging tool 370 coupled to a logging cable 374 such as, for example, for wireline applications. The tool body 370 containing the tool 100 can include electronics to initiate and collect measurements. Such electronics can include a processing unit to provide analysis of data over a standard communication mechanism for operating in a well. Alternatively, electronics can include a communications interface to provide measurement signals collected by the tool 100 to the surface over a standard communication mechanism for operating in a well, where these measurements signals can be analyzed at a processing unit 392 at the surface to provide analysis of data. The logging cable 374 may be realized as a wireline (multiple power and communication lines), a mono-cable (a single conductor), or a slick-line (no conductors for power or communications), or other appropriate structure for use in the borehole 390.

As an example of an operation, the wireline ranging tool 370 (e.g., azimuthal EM logging tool 100) is configured to take ranging measurements from which a relative distance and direction to between a target well 390 and a ranging well 306 are calculated until a desired distance to the target well is reached. The desired distance varies with a frequency used by the azimuthal EM logging tool to take electromagnetic measurements. The azimuthal EM logging tool 100, disposed on the drill string in the ranging well 306 after the desired distance is reached, is configured to take electromagnetic measurements that are compared with the calculated relative distance and direction to calibrate the azimuthal EM logging tool 100 to provide control of the drilling operation to parallel the target well 390, intersect the target well, or avoid the target well. A controller 393 is configured to accept the relative distance and direction and the electromagnetic measurements and determine a calibration function to provide control of the drilling operation.

Many embodiments may be realized. Several examples will now be described.

Example 1 is a method for ranging between a target well and a ranging well, the method comprising determining, during a non-drilling period, a distance and direction from a ranging well to a target well using a ranging tool; collecting azimuthal electromagnetic measurements using an azimuthal electromagnetic logging tool; and calibrating the azimuthal electromagnetic logging tool by comparing electromagnetic measurements taken by the azimuthal electromagnetic logging tool with the distance and direction.

In Example 2, the subject matter of Example 1 can further include using the calibrated azimuthal electromagnetic logging tool to collect azimuthal electromagnetic measurements during drilling to maintain or adjust the distance between the ranging well and the target well while drilling.

In Example 3, the subject matter of Examples 1-2 wherein the azimuthal electromagnetic logging tool is disposed in a drill string and comprises a transmitting antenna and a receiving antenna, and wherein using the azimuthal electromagnetic logging tool on the drill string to maintain or adjust the distance while drilling comprises transmitting an electromagnetic signal from the transmitting antenna and receiving a reflected version of the electromagnetic signal at the receiving antenna wherein at least one of the transmitting antenna and the receiving antenna are tilted with respect to a longitudinal axis of the drill string.

In Example 4, the subject matter of Examples 1-3 can further include using the azimuthal electromagnetic logging tool to maintain or adjust the distance between the ranging well and the target well while drilling.

In Example 5, the subject matter of Examples 1-4 wherein determining the relative distance and direction from the ranging well to the target well comprises calculating the distance and direction in response to an electromagnetic signal received by the ranging tool from the target well.

In Example 6, the subject matter of Examples 1-5 wherein calibrating the azimuthal electromagnetic logging tool comprises comparing the electromagnetic measurements to the distance and direction; and calibrating logging while drilling ranging and azimuth calculations to measurements provided by the ranging tool, according to results obtained by said comparing.

In Example 7, the subject matter of Examples 1-6 wherein determining the distance and direction from the ranging well to the target well comprises taking electromagnetic ranging measurements using a wireline tool, the method further comprising continuing to take electromagnetic ranging measurements with the wireline tool at different positions until a distance corresponding to a detection range is reached.

In Example 8, the subject matter of Examples 1-7 wherein said calibrating includes: collecting distance measurements using both the ranging tool and the azimuthal electromagnetic logging tool; and estimating parameters of a calibration function that associates depth-dependent ranging tool measurements collected during the non-drilling period with depth-dependent azimuthal electromagnetic logging tool measurements.

Example 9 is a method comprising: using a wireline tool in the ranging well to perform electromagnetic ranging measurements on a target well; calculating a distance and a direction between the ranging well and the target well based on the electromagnetic ranging measurements; using an azimuthal ranging tool that is positioned in the ranging well to take electromagnetic measurements when the distance is within a detection range of the azimuthal ranging tool; and calibrating the azimuthal ranging tool by comparing the electromagnetic measurements to the calculated distance and direction.

In Example 10, the subject matter of Example 9 can further include using the azimuthal ranging tool during drilling in the ranging well to control drilling operations to maintain or adjust the distance and direction between the ranging well and the target well while drilling.

In Example 11, the subject matter of Examples 9-10 can further include collecting distance measurements using the wireline tool and the azimuthal ranging tool; and wherein said calibrating the azimuthal ranging tool includes estimating parameters of a calibration function using the distance measurements In Example 12, the subject matter of Examples 9-11 can further include $dw(zi)=f(dl(zi), p)$ wherein $dw(zi)$ represents relative distance measurements from the wireline tool at a depth $zi$, $dl(zi)$ represents relative distance measurements from the azimuthal electromagnetic tool at the depth $zi$, $f$ represents a mapping function with mapping parameter vector p.

In Example 13, the subject matter of Examples 9-12 can further include wherein the mapping parameter vector p is determined by $p=\text{argmin } p(dw(zi)-f(dl(zi), p))$.

In Example 14, the subject matter of Examples 9-13 can further include calibrating azimuthal electromagnetic tool measurements by $dlcal(zi)=f(dl(zi), p)$ wherein $dlcal(zi)$ is a corrected LWD range measurement at the depth $zi$.

In Example 15, the subject matter of Examples 9-14 can further include wherein the mapping function comprises $f(A, p)=Ap$ wherein A is an azimuth measurement.

In Example 16, the subject matter of Examples 9-15 can further include wherein the mapping parameter vector p is a function of azimuth angle $\phi$.

Example 17 is a system comprising: a ranging tool in a ranging well, the ranging tool configured to determine, during a non-drilling phase, a distance and a direction to a target well; and an azimuthal ranging tool in the ranging well, said azimuthal ranging tool configured to collect azimuthal electromagnetic measurements and to compare the collected azimuthal electromagnetic measurements with the determined distance and direction to calibrate the azimuthal ranging tool.

In Example 18, the subject matter of Example 17 wherein the ranging tool is a wireline logging tool, and wherein the azimuthal ranging tool comprises a transmit coil antenna and a receive coil antenna, wherein at least one of the transmit coil antenna or the receive coil antenna are tilted with respect to a longitudinal axis of the wireline logging tool.

In Example 19, the subject matter of Examples 17-18 wherein the azimuthal ranging tool is configured to collect azimuthal electromagnetic measurements when the azimuthal ranging tool is within a detection range of the target well.

In Example 20, the subject matter of Examples 17-19 wherein the detection range varies with a frequency used by the azimuthal ranging tool to take electromagnetic measurements.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system comprising:
   a wireline logging tool in a ranging well, the wireline logging tool configured to determine, during a non-drilling phase, a distance and a direction to a target well; and
   an azimuthal ranging tool in the ranging well, said azimuthal ranging tool configured to collect azimuthal electromagnetic measurements and to compare the collected azimuthal electromagnetic measurements with the determined distance and direction to calibrate the azimuthal ranging tool.

2. The system of claim 1, wherein the azimuthal ranging tool comprises a transmit coil antenna and a receive coil antenna, wherein at least one of the transmit coil antenna or the receive coil antenna are tilted with respect to a longitudinal axis of the wireline logging tool.

3. The system of claim 1, wherein the azimuthal ranging tool is configured to collect azimuthal electromagnetic measurements when the azimuthal ranging tool is within a detection range of the target well.

4. The system of claim 1, wherein the detection range varies with a frequency used by the azimuthal ranging tool to take electromagnetic measurements.

5. The system of claim 1, wherein the azimuthal ranging tool is configured to collect azimuthal electromagnetic measurements during drilling to maintain or adjust the distance between the ranging well and the target well while drilling.

6. The system of claim 5, wherein the azimuthal ranging tool is disposed in a drill string and comprises a transmitting antenna and a receiving antenna, and wherein using the azimuthal electromagnetic logging tool on the drill string to maintain or adjust the distance while drilling comprises transmitting an electromagnetic signal from the transmitting antenna and receiving a reflected version of the electromagnetic signal at the receiving antenna wherein at least one of the transmitting antenna and the receiving antenna are tilted with respect to a longitudinal axis of the drill string.

7. The system of claim 1, wherein the azimuthal ranging tool is configured to determine the distance and direction to the target well by calculating the distance and direction in response to an electromagnetic signal received by the wireline logging tool from the target well.

\* \* \* \* \*